(12) United States Patent
Bertin et al.

(10) Patent No.: US 6,299,541 B1
(45) Date of Patent: Oct. 9, 2001

(54) DOUBLE TORQUE FLYWHEEL IN PARTICULAR FOR MOTOR VEHICLE (75) Inventors: Patrice Bertin, Mery-sur-Oise; Daniel Fenioux, Epinay-sur-Seine; Giovanni Grieco, Colombes, all of (FR)

(73) Assignee: Valeo (FR)

( * ) Notice: Subject to any disclaimer, the term of this patent is extended or adjusted under 35 U.S.C. 154(b) by 0 days.

(21) Appl. No.: 09/462,160
(22) PCT Filed: May 5, 1999
(86) PCT No.: PCT/FR99/01066
 § 371 Date: Apr. 13, 2000
 § 102(e) Date: Apr. 13, 2000
(87) PCT Pub. No.: WO99/57456
 PCT Pub. Date: Nov. 11, 1999

(30) Foreign Application Priority Data

May 5, 1998 (FR) .................................................. 98 05652

(51) Int. Cl.[7] ........................................................ F16D 3/12
(52) U.S. Cl. ................................ 464/68; 464/62; 464/66; 192/70.17; 192/214
(58) Field of Search .................................. 464/62, 66, 67, 464/68; 74/574; 192/70.17, 214, 214.1

(56) References Cited

U.S. PATENT DOCUMENTS 5,367,920 * 11/1994 Bonfilio ................................ 74/574
5,611,416   3/1997 Berger et al. .
6,053,296 *  4/2000 Lopez ................................ 192/70.25

FOREIGN PATENT DOCUMENTS

| 19645174A1 | 9/1997 | (DE) . |
| 19728422A1 | 1/1998 | (DE) . |
| 0798490A1 | 1/1997 | (EP) . |
| 2660037 | 9/1991 | (FR) . |
| 2244543A | 12/1991 | (GB) . |

* cited by examiner

Primary Examiner—Lynne H. Browne
Assistant Examiner—Aaron Dunwoody
(74) Attorney, Agent, or Firm—Liniak, Berenato, Longacre & White, LLC (57) ABSTRACT A double flywheel vibration damper including two coaxial masses free to rotate relative to each other and acting against elastic parts, in which one of the masses, referred to as the first mass, is intended to be fastened to a drive shaft, whereas the other mass, referred to as the second mass, includes a reaction plate assuring rotational connection to a driven shaft, and in which the first mass has a central hub projecting axially and carrying bearing member operating between the second mass and the central hub to enable the second mass to rotate on the first mass, wherein the central hub comprises two aligned coaxial parts, namely a first hub supporting the second mass rotationally via the bearing member fitted on this first hub, and a second hub intended to be fastened to the drive shaft, and wherein the second hub constitutes an axial spacer between the drive shaft and the first hub. The invention is applicable to motor vehicle transmission systems.

12 Claims, 6 Drawing Sheets

DOUBLE TORQUE FLYWHEEL IN PARTICULAR FOR MOTOR VEHICLE

BACKGROUND OF THE INVENTION

The present invention relates to a double flywheel vibration damper, notably for use in a motor vehicle, for example of the type of those described in the documents FR-A-2 736 116 and EP-A-0 798 490.

DESCRIPTION OF THE PRIOR ART

In these types, the double flywheel includes two mobile coaxial masses free to rotate with respect to each other and acting against elastic parts.

One of the masses, referred to as the first mass, is intended to be fastened to a drive shaft, such as the engine crankshaft of the vehicle, whereas the other mass, referred to as the second mass, is intended to be connected in a disengageable manner to a driven shaft such as the gearbox input shaft. The first mass carries the second mass rotationally on a hub equipped with bearing means, the bearing being located between the hub and the second mass.

The hub projects axially in the direction of the second mass, which is thereby offset axially with respect to the first mass.

Said elastic parts are mounted between the two masses and form part of an elastic torsion-absorbing coupling between the first mass and the second mass.

The hub extends centrally at the inner edge of the first mass.

In the document FR-A-2 736 116 the action of the elastic parts is circumferential. In the document EP-A-0 798 490 the action of the elastic parts elastic parts is radial.

We see therefore that there are several known types of double flywheel vibration damper systems.

SUMMARY OF THE INVENTION

However, it can be useful to be able to fit any type of double flywheel vibration damper on the end of a drive shaft, such as a crankshaft. The purpose of the present invention is to respond to this need in a simple and cost-effective manner.

According to the present invention this problem is resolved by the fact that the hub is formed of two coaxial parts axially aligned, namely a first hub that supports rotationally the second mass on bearing means mounted on this first hub, and a second hub that forms an axial spacer between the drive shaft and said first hub.

The invention is therefore a double flywheel vibration damper including two coaxial masses free to rotate relative to each other and acting against elastic parts, in which one of the masses, referred to as the first mass, is intended to be fastened to a drive shaft, whereas the other mass, referred to as the second mass, includes a reaction plate assuring rotational connection to a driven shaft, and in which said first mass has a central hub projecting axially and carrying bearing means operating between said second mass and said central hub to enable said second mass to rotate on said first mass, wherein said central hub comprises two aligned coaxial parts, namely a first hub supporting said second mass rotationally via said bearing means fitted on this first hub, and a second hub intended to be fastened to said drive shaft, and wherein said second hub constitutes an axial spacer between said drive shaft and said first hub.

The advantage of the invention is that said first hub prolongs said second hub, which means that it is possible to fit on the second hub any type of double flywheel vibration damper equipped with the first hub.

This second hub allows the drive shaft to be shortened and the hub can be made of a much less expensive material than that of the drive shaft, for example a crankshaft, which is forged and machined. This second hub penetrates inside the crankcase of the internal combustion engine.

The solution is therefore simple and inexpensive.

Advantageously the second hub has on its outer edge, in axial succession: a recess, a first throat and a second throat larger than the first throat.

The recess, in contact with a fixed wall, such as the wall of the engine crankcase, can be used to house a seal between this wall and the second hub. This dynamic seal is in rotational contact with the second hub and prevents oil leakage from the engine. The first throat serves to recover any oil leaking from the engine. The second throat serves to collect any particles and leaked liquid arriving radially from the outside.

The second mounting hub therefore also serves as an anti-pollution hub and a hub for rotational contact with the seal mounted on the fixed wall.

In a variant of the invention, the second hub carries the rotor of an electric machine. This electric machine also includes a stator mounted coaxially relative to the rotor. The rotor and the stator are mounted radially one above the other.

In an embodiment, the stator surrounds the rotor. The stator is carried by a fixed support part, with second bearing means between said support part and said second hub.

In this manner, the stator is positioned relative to the rotor, and the stator/rotor air-gap is precisely defined.

The stator includes windings, so the electric machine, of the synchronous or asynchronous motor type, can provide a starter or alternator for the motor vehicle.

This electric machine allows vibrations to be filtered, and the double flywheel vibration damper can be rudimentary, since the angular movements of the elastic parts of this flywheel are smaller. Thanks to the second hub carrying the rotor, efficient filtering of the vibrations is achieved thanks to the inertia of the system.

The electric machine allows the internal combustion engine of the motor vehicle to be accelerated or braked.

The electric machine allows the vehicle's engine to be stopped at traffic lights and to be restarted. For more details, see for example the document WO 98/05882.

The second hub can of course carry the rotor of the machine and have a recess and a first throat, since the rotor is carried, in one embodiment, by a second web of sinuous profile mounted near the free end of the second hub, in other words at some distance from the drive shaft. The second hub may therefore have, in axial succession: the recess, the first throat, the second bearing means (such as a ball bearing), and the second sinuous web.

Thanks to the invention, the double flywheel can be fitted with a transversal metal support plate associated with the first hub and the plugs described in the document FR-A-2 736 116 are eliminated (these plugs located opposite pins fixed to the second mass serve to drive rotationally a friction ring carried by the first mass and forming part of the axially acting friction means).

In one embodiment, the second hub presents at its free end a rim extending over the aforementioned holes to block them.

The side of this rim facing the fixed wall advantageously constitutes one lateral face of the second throat. The friction face of the reaction plate forming part of the second mass is thereby well protected by the second hub. The same applies for the axially acting friction means and the parts inside the first mass. In a variant, the face of the free end of the second hub blocks the aforementioned holes.

The presence of the aforementioned holes is obviously not mandatory. For example, the double flywheel could be equipped with pieces of plate assembled by riveting.

Advantageously the support plate is fixed to the first hub to form a subassembly constituting the double flywheel vibration damper, and the second hub provides a bearing surface for this support plate. In a variant, the first hub has a web providing a bearing surface for the support plate.

In one embodiment the first hub has a transversal shoulder providing a bearing surface for the support plate.

It is this subassembly, forming a module, that is placed on the second hub with formation of an annular channel open towards the outside between the fixed wall and support plate extending parallel to the fixed wall. The bottom of this channel is formed by the second hub. A single series of fastening parts can be used to fasten the two hubs to the drive shaft, although it is advantageous to provide two series of fastening parts.

The two series of fastening parts alternate circumferentially. In a variant, they are located on circles of different diameter.

The first series of fastening parts serves to fix the aforementioned subassembly to the second hub, whereas the second series of fastening parts serves to fix the second hub on the end of the drive shaft.

The fastening parts, bolts for example, are therefore shorter. In addition, to make repairs, it is possible to remove the double flywheel leaving the second hub in place. In one embodiment, the first series of fastening parts is axially shorter than the second series of fastening parts. These series of fastening parts can have different diameters.

Advantageously a support disk surrounds the free end of the second hub thus increasing the inertia of the first mass. This disk is fixed on its inner edge to the support plate by first fastening means, such as an internal series of rivets.

Advantageously the second means of fastening are used between the outer edges of the support disk and the supported plate.

In this manner the support plate is less sensitive to the axial vibrations caused by the drive shaft at certain engine speeds.

The support disk carries the starter ring gear, radially outside an annular rim of axial orientation on the outer edge of the support plate.

The support disk can also carry on its outer edge an ignition timing mark, as described for example in the document FR-A-2 526 106.

In a variant, a plate is fixed on the support plate to enable the fitting of friction means within its thickness. In one embodiment, the support disk extends radially beyond the reaction plate and has a tortuous profile. This plate is interposed between the support plate and the support disk.

The reaction plate of the second mass advantageously has on its outer edge an annular rim of axial orientation directed towards the starter ring gear and the first mass.

The rim extends radially beyond the support plate.

In this manner, the rear face of the reaction plate is a flat friction face for a friction disk. This friction face is prolonged radially by the edge of the reaction plate that has tapped holes for fastening a standard bowl-shaped clutch cover.

The reaction plate can of course be fitted with fan blades near its edge, and outside the edge of the support plate.

In a variant, the reaction plate has an axial orientation skirt on its outer edge which covers the pads of a friction disk forming part of the clutch system to which the reaction plate belongs.

This ensures that dust produced by abrasion of the friction pads does not pollute the rotor or stator of the electric machine mounted on the second hub.

In a variant, the support disk can be extended axially in the direction of the reaction plate and beyond the support plate, as described in the document FRA2-526-106.

This extension then carries fan blades on its free edge.

In all cases, the ventilation is efficient since the blades are located at a large distance from the axis. The second mass of course has air holes radially beneath the friction face of its reaction plate.

This reaction plate, owing to the presence of its edge, can be recessed on its face facing the first mass in order to provide clearance for the edge of the support plate.

Thanks to the invention, the first hub or the second hub can carry internally a pilot bearing which houses the end of the driven shaft.

This pilot bearing is preferably mounted on the first hub so that it is possible to remove the double flywheel easily, leaving the second hub fixed to the drive shaft.

The inside of the first hub can be used advantageously to house the hub of the friction disk of the friction clutch to which the reaction plate belongs.

Centering means are provided between the first and second hubs.

Thanks to all these provisions, the first hub can consist simply of a thin-walled, inexpensive metal tube.

Other parts, such as the support plate, can be fastening to this tube, by welding for example. In a variant, crimping is used. The pilot bearing is mounted on the inside of the first hub using a self-adjusting ring with at least on slot. This ring avoids the need for reworking operations and enables the use of a thin-walled tubular hub.

It is noted that, thanks to the invention, the double flywheel can contain mostly metal parts, preferably pressed form plate.

This double flywheel includes at least three parts; the support disk of the starter ring gear (the gear and disk can be a single part), the support plate and a guide ring or closing ring fastened to the edge of the support plate.

The support disk can be standard, whatever the type of double flywheel.

The guide ring or closing ring have a large internal diameter. The support plate is centered by the first hub, being fixed to the first hub.

Thanks to the invention the support disk can be very close to the engine crankcase and notably the fastening screws whose heads project axially.

In the variant, the support disk forms a closing ring and weights are enclosed between the support plate and support disk.

The crankshaft, or more generally the drive shaft, need not be hollow to receive the end of the driven shaft. Moreover, the hubs are of simple shape: they are cylindrical.

BRIEF DESCRIPTION OF THE DRAWINGS

The invention will be better understood and further advantages will become clear on reading description below of preferred embodiments making reference to the attached drawings, of which.

In all the figures, common parts carry the same reference numbers.

DETAILED DESCRIPTION OF PREFERRED EMBODIMENTS

All these figures illustrate a double flywheel vibration damper which is employed between the motor vehicle's internal combustion engine and its transmission system, notably to filter out vibrations and provide a clutching/declutching system.

This flywheel presents two coaxial masses 1, 2 mounted so as to be able to rotate, when driven by the vehicle's engine, around an axis of rotation X—X that constitutes the axis of symmetry of the double flywheel. The second mass 2 is driven rotationally by the first mass 1 intended to be connected to a drive shaft (here the crankshaft of the motor vehicle), whereas the second mass 2 is intended to be connected in a disengageable manner to a rotating driven shaft (here the gearbox input shaft of the vehicle).

Figure 2:
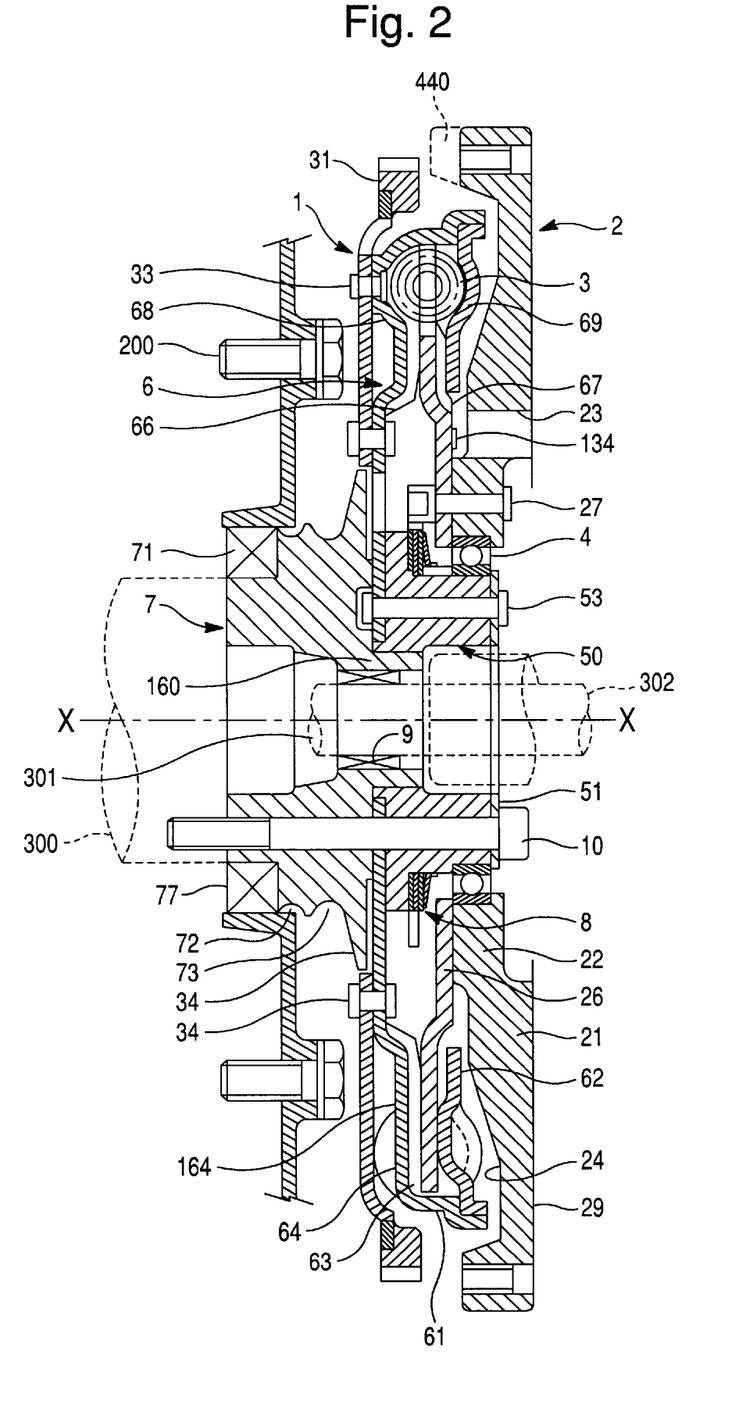
Figure 3:
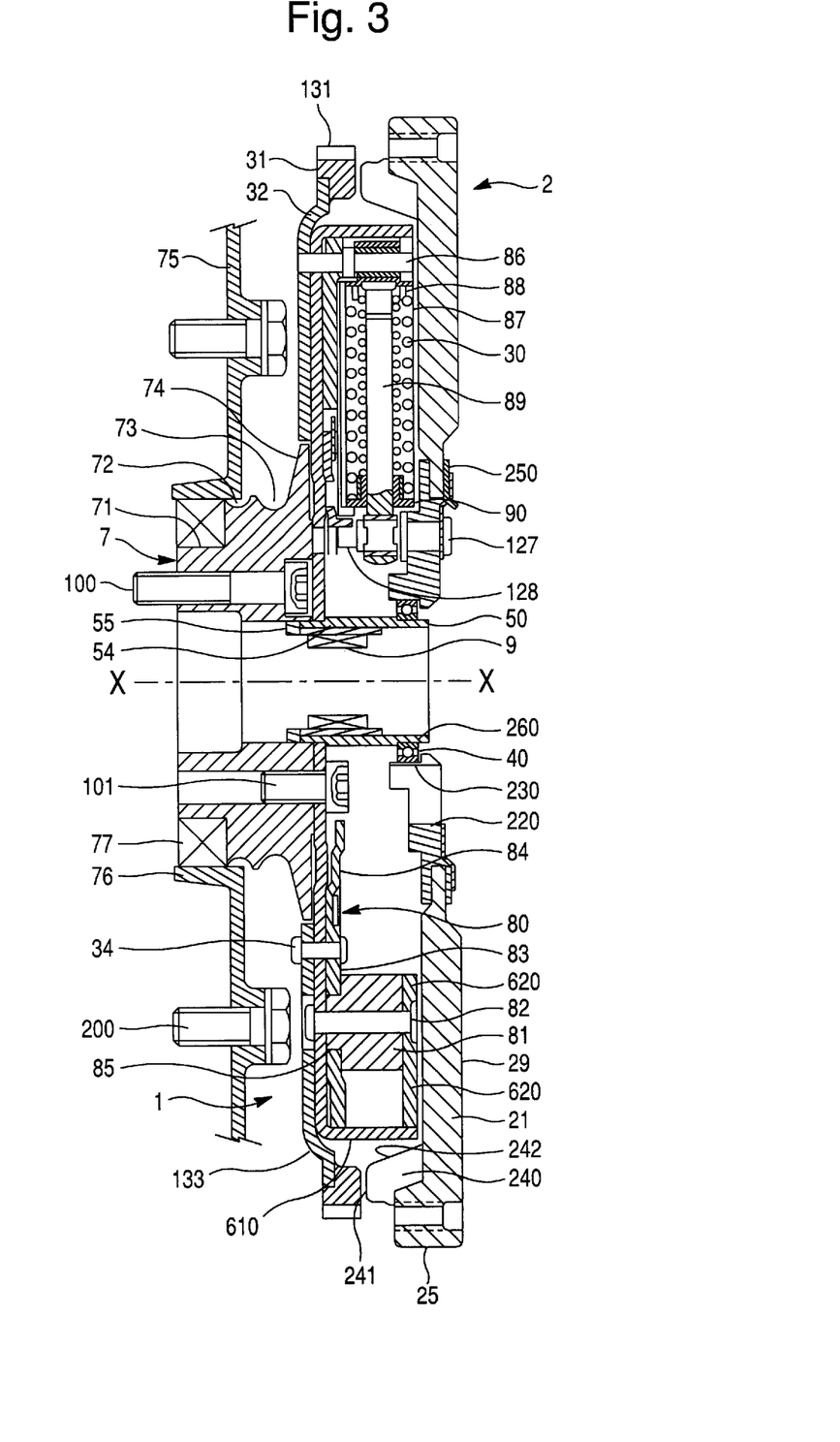

The first mass 1 presents centrally, on its inner edge, a first hub 5 (FIGS. 1 and 2), 50 (FIG. 3).

This first hub 5, 50 carries bearing means 4 (FIGS. 1 and 2), 40 (FIG. 3) to enable rotation of the second mass 2 on the first mass 1.

The first hub 5, 50, which projects axially in the direction of the second mass 2, has a cylindrical shape.

Figure 1:
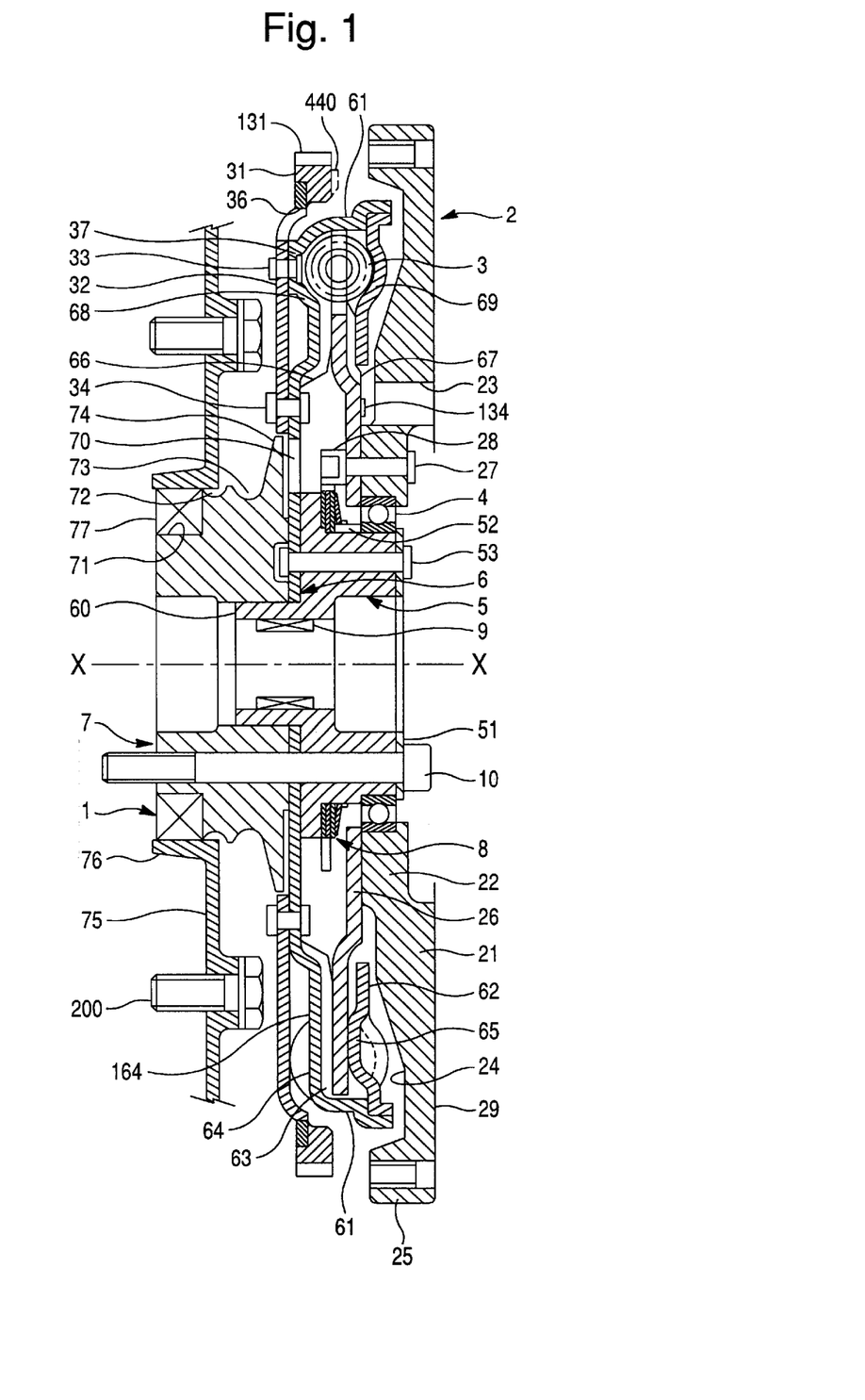
FIGS. 1 to 3 are axial sections of three embodiments of a double flywheel vibration damper according to the invention.

In FIGS. 1 and 2, the first hub 5 is heavy, whereas in FIG. 3 the first hub 50 is light and consists of a thin metal tube, easy and inexpensive to make.

The bearing means are mounted between the outer surface of the first hub 5, 50 and the inner surface of the second mass 2 which is provided with a central housing for this purpose.

In this manner, the first hub 5, 50 penetrates at its free end into the central hole of the second mass 2, which is therefore offset axially relative to the first mass 1.

The bearing means 4, 40 can consist of plain bearings of a material offering a low friction coefficient, such as synthetic material reinforced with fibers, for example glass or carbon. Such a plain bearing is referenced 400 in FIG. 4.

In a variant, described in the document FR-A-2 706 006, one can make use of a coating of amorphous carbon-diamond. In another variant, the coating is a quasi-crystalline. In the embodiments shown in FIGS. 1 to 3, the bearing means 4, 40 consists of ball bearings.

In the figures, the bearing means consist of a single row of balls, but obviously the bearing could have two rows of balls. In FIGS. 1 and 2, the ball bearing 4 is of larger size than the ball bearing 40 in FIG. 3.

In all the figures, the first hub 5, 50 has various diameters on its outer edge to form a shoulder which is used to block in one axial direction the internal race of the ball bearing 4, 40 slid onto the free end of smaller diameter of the first hub 5, 50. In the other axial direction, the internal race of the bearing 4, 40 is immobilized axially by a bearing washer 51 (FIGS. 1 and 2) or a circlip 260 (FIG. 3) housed in a groove in the free end of the first hub 50.

On the inner edge of the second mass 2 there is an internal hub 22 (FIGS. 1 and 2), 220 (FIG. 3) whose internal bore fits over the outer race of the ball bearing 4, 40 and which has a shoulder that blocks the bearing in the same axial direction as the bearing washer 51 or circlip 260.

The internal hub 22, 220 therefore delimits the central hole of the second mass 2, which includes a plate 21 forming the reaction plate of a friction clutch. This plate 21 is of moldable material, here cast iron. In FIGS. 1 and 2, the reaction plate 21 forms part of the internal hub 22. In FIG. 3, the internal hub 220 and the plate 21 are separate parts, and a friction-type torque limiter 250 is fitted between the inner edge of the plate 21 and the outer edge of the internal hub 220, as described in the document EP-A-0 798 490.

When the vehicle engine starts or stops, this torque limiter enables the resonance frequency to be passed without damage to the double flywheel, since the limiter provides some relative slippage of the plate 21 relative to the internal hub 220 carrying the rotating plate 21.

In this case, the internal hub 220 is made of hardened steel and, in a variant not shown here, forms the outside race of the ball bearing, as described in the document EP-A-0798 490.

In FIG. 3, the second mass 2 could obviously be one-piece as in FIGS. 1 and 2. Inversely, the second mass 2 in FIGS. 1 and 2 could be in two parts, as in FIG. 3. All different combinations are possible.

The ball bearing 4, 40 could be fitted by welding, for example welding under pressure using capacitor discharge, on the first hub 5, 50 and/or on the internal hub 22, 220.

In all the figures, the two masses 1, 2 are fitted free to rotate relative to each other acting against the elastic parts 3 (FIGS. 1 and 2), 30 (FIG. 3) and friction means 8 (FIGS. 1 and 2), 80 (FIG. 3) acting axially.

In FIGS. 1 and 2, the elastic parts 3 are mounted circumferentially between the two masses 1 and 2, as described for example in the document FR-A-2 736 16. In FIG. 3, the elastic parts 30 are mounted radially between the two masses as described for example in the documents FR-A-97/12115 30/09/1997 filed on Sep. 30, 1997, or EP-A-0 798 490.

For more details, refer to these three documents, noting that in FIG. 3 the elastic parts 30 work in compression but can obviously be replaced by traction springs. Here, the elastic parts 3, 30 are coil springs.

As explained, the first mass 1 is intended to be fitted on the vehicle's engine crankshaft. This first mass 1 is linked in an elastic manner to the second mass via the elastic parts 3, 30, which, in a variant, consist of blocks in elastic material such as an elastomer. A torsional vibration damper made of elastic parts 3, 30 is therefore fitted between the two masses 1, 2; the vibration damper is fitted axially between these two masses. The axially acting friction means 8, 80 form part of this vibration damper and include a friction ring that is driven, possibly after take-up of play, by the second mass 2 and that rubs against two surfaces of the first mass 1. The friction ring is mounted on the first mass.

The second mass 2, thanks to its reaction plate 21, is rotationally connected in a disengageable manner to the gearbox input shaft. In a known manner, the reaction plate 21 has a friction face 29 for a friction disk shown in the aforementioned documents FR-A-2 706 006, EPA0-798-490 and FR-97/12115, and in FIG. 5.

The second mass 2 is therefore connected in a disengageable manner to the gearbox input shaft via the friction disk which has on its inner edge a central hub whose inner splines provide rotary connection with the gearbox input shaft.

The reaction plate 21 forms part of the friction clutch and has on its outer edge an annular rim 25 of axial orientation in which tapped holes (not referenced in the figures) are provided for fastening a bowl-shaped lid.

Friction pads are fitted on the outer edge of the friction disk. These are intended to be squeezed between the friction face 29 of the reaction plate 21 and the opposite friction face of a pressure plate under the action of elastic engaging means, such as a diaphragm spring, pressing on the lid to actuate the pressure plate. The engaging means are associated with disengaging means in the form of declutching control levers, for example the fingers of a diaphragm. By acting, for example with the aid of a clutch release bearing, either pushing or pulling depending on the type of clutch, it is possible to gradually lessen the force exerted by the engaging means on the pressure plate and release the friction pads form the friction disk.

For more details, refer for example to FIG. 2 of the document FR-97/12115, and to the document FR-A-2 166 604.

Thanks to this mechanism, the friction clutch is normally engaged and the torque is transmitted from the engine crankshaft to the gearbox input shaft. By acting centrally on the declutching control levers, with the aid of the clutch release bearing, the clutch friction connection is disengaged and the engine torque is then no longer transmitted to the gearbox input shaft which penetrates inside the first hub 5, 50.

A pilot bearing 9 is provided to support the free end of the gearbox input shaft also supported by a bearing fitted in the gearbox casing.

Here, the hub of the friction disk penetrates inside the first hub 5, 50 as shown in FIG. 2 of the aforementioned document FR-97/12115.

According to a characteristic of the invention, the first hub 5, 50 is intended to be rigidly connected to the second hub 7, which in turn is fixed to the engine crankshaft of the vehicle, or more generally to another drive shaft, with the aid of the fastening parts 10 (FIGS. 1 and 2), 100 (FIG. 3).

The first hubs 5, 50 extends the second hub 7 axially. These hubs 5, 50-7, have the same axis of axial symmetry, namely X—X. They are of cylindrical shape here and of axial orientation.

In this manner, according to the invention, the central hub of the first mass is in two cylindrical coaxial parts of simple shape, one providing an axial continuation of the another one. These parts, here of cylindrical shape, are centered relative to each other and are axially aligned.

We therefore see that the first hub 5, 50, providing the support hub of the second mass 2, is attached to the engine crankshaft, or more generally to any drive shaft, via the second hub 7, forming the fastening mounting hub. It is therefore possible to form a single assembly in the form of a torsion-absorbing double flywheel, including the double flywheel with only the first hub 5, 50; this single assembly, forming a module, is then mounted on the second hub 7 in a manner described below.

In this manner, because the first and second hubs are aligned axially, the central bore of the first hub 5, 50 prolongs the central bore of the second hub 7 axially.

The engine crankshaft is shorter axially. The first hub 5, 50 constitutes the hub of a classic vibration damping (i.e. torsion-absorbing) double flywheel. The second hub 7 is an intermediate part forming a spacer between the crankshaft and the first hub 5, 50. This spacer allows the first hub 5, 50 to be fastened to the crankshaft and thereby support the first hub 5, 50, which in turn carries the second mass 2.

Centering means, described below, are inserted between the first hub 5, 50 and the second hub 7 to center the hubs 5, 50-7 relative to each other so that they have the same axis of axial symmetry X—X.

In FIGS. 1 and 3, the bearing pilot 9 is mounted inside the first hub 5, 50, whereas the bearing in FIG. 2 is mounted inside the second hub 7.

According to a characteristic of the invention, a support plate 6 is inserted axially between the first hub 5, 50 and the second hub 7. The elastic parts 3, 30 act between the support plate 6 and the second mass 3. This support plate 6, perpendicular to the axis X—X, is strengthened by an annular support disk 32 carrying a starter ring gear 31. The support plate 6 bears on the face at the free end of the second hub 7, which thereby positions the support plate 6.

The support plate 6 and support disk 32 made of metal, stamped steel plate in this embodiment, and lie parallel to the reaction plate 21.

The centering means include an annular centering sleeve delimited on the outside by a stop shoulder.

The sleeve is part of either the first hub 5, 50 or the second hub 7 and cooperates with the inner edge of the another part (respectively the second hub 7 or the first hub 5, 50), referred to hereinafter as the "second part".

More precisely, the outer edge of the sleeve is in close contact with the inner edge of the second part provided by its internal bore. The sleeve penetrates inside the second part and the pilot bearing 9 fits inside it. In a variant, this bearing can be replaced by a plain bearing of low friction coefficient or by a coating of the amorphous diamond-carbon type.

In this manner, the sleeve always carries a pilot bearing 9 to house the free end of the gearbox input shaft, or, more generally, the free end of another driven shaft.

According to a characteristic of the invention, the second hub 7 has successively (moving axially from the crankshaft towards the first hub 5, 50 aligned axially with the second hub 7): a recess 71, a first throat 72, a second throat 73 and a rim 74 projecting radially away from the axis X—X. The two throats 72 and 73, made in the outer edge of the second hub 7, are round-bottomed and have sloping sides. The throats 72 and 73 therefore have the shape of rounded recesses facing radially outwards. The first throat 72 is adjacent to the recess 71, here of annular shape; one of its sides of the second throat 73 joins smoothly one of the faces of the rim 74.

The fixed wall of the vehicle's engine crankcase 75 has a central hole delimited by a rim 76 of axial orientation, pointing axially away from the first hub 5, 50. The rim 76 forms part of the fixed crankcase wall 75 and extends to cover the recess 71.

The rim 76 surrounds the recess 71 so that together they delimit an annular cavity 76 intended to house a sealing ring 77 which makes elastic contact with the second hub 7 and is immobilized axially and rotationally by the rim 76. This sealing ring 77, referred to as a "running seal", prevents engine oil from escaping. The end of the drive shaft, here the crankshaft, is therefore simplified because the sealing ring 77 is not in contact with the crankshaft, which is consequently shorter axially. The second hub 7 is here made of metal, being a less expensive material than that of the crankshaft whose free end carries, for example, a drive belt pinion. The second hub penetrates partially inside the engine crankcase.

In a variant, the second hub 7 is made of sintered material. In another variant, the second hub 7 is of moldable material.

The solution provided by the invention is therefore inexpensive. The first throat 72 serves to deflect and recycle oil leakages from the engine. The other throat 73, nearer the support plate 6 (here of stamped steel plate), lies at the bottom of a channel formed between the engine crankcase wall 75 and support plate 6, parallel to the crankcase wall 75. The rim 74 positioned near the support plate 6 has holes 70 described below.

The rim 74 forms a plug for the holes 70, since its outer edge extends beyond these holes.

The second throat 73 is a drainage throat for oil (or other liquid), and also traps any particles coming from outside.

The second hub 7 therefore ensures that any oil leakage from the engine, or any other particles, will not contaminate the friction face 29 of the reaction plate 21 nor the friction means 8, 80 acting axially, or more generally all parts located between the support plate 6 and the reaction plate 21.

The hub 7 therefore also provides for protection against all pollution, for blocking of the holes 70, for contact with the sealing ring 77, and for a bearing surface for the support plate 6.

The central hole of the support disk 32 has a diameter greater than the annular rim 74, and is positioned just outside this rim.

The disk 32 therefore prolongs the rim 74 radially and lies radially outside the holes 70.

We therefore see that this support disk 32 doubles the thickness of the support plate 6, radially outside the rim 74 whose thickness in its outer edge is substantially the same as that of the support disk 32, here of uniform thickness. The inertia of the first mass 1 is thereby increased in a simple and economical way, especially since the starter ring gear 31, presenting a set of teeth 131 intended to be engaged by the vehicle's starter motor during starting of the engine, is mounted on the outer edge of the disk 32. The aforementioned channel is therefore delimited by the crankcase wall 75, the disk 32, and the rim 74. This annular channel is blind, its bottom being formed by the two throats 72 and 73 of the second hub. The crankcase wall 75 is parallel to the support disk 32 and to the support plate 6.

We note that the second throat 73 is both deeper and wider than the first throat 72 used to recover leaked oil. In a variant, the second hub 7 is of greater radius at the position of the first throat 72 such that the latter lies at a greater radius than the second throat 73, and the rim 74 is shorter and stops short of the holes 70 opposite the inner edge of the support plate 6 offset axially in the direction of the reaction plate.

The inner edge of the plate 6 joins the main part of the plate via a rounded or inclined section forming a deflector and extending over the rim 74, thus protecting the holes 70.

The recess 71 and the throats 72, 73 are obtained by machining, sintering or molding depending on the constitution of the second hub 7 forming a spacer.

The support plate 6 includes an annular rim 61 (FIGS. 1 and 2), 610 (FIG. 3) whose outer edge is of axial orientation. The starter ring gear 31 extends radially outside this edge. A guide ring 62 (FIGS. 1 and 2) or closing ring 620 (FIG. 3) is attached to this outer edge of the annular rim, close to the reaction plate 21.

More precisely, the support disk 32 has a peripheral section (not referenced in the figure) at its outer edge offset axially in the direction of the reaction plate 21 from the main part of this disk 32 perpendicular to the axis X—X.

This peripheral section of transversal orientation extends radially beyond the rim 61, 610 and joins the main part of the disk 32 in a curved section (not referenced in the figure) in which there are holes 36 (FIG. 1) used to obtain perfect positioning of the starter ring gear 31, fastened by welding to the peripheral section of the support disk 32.

In this manner, the teeth of the ring gear 31 are parallel to the axis X—X. This ring gear 31 has a recess, on its inner edge of its face facing away from the reaction plate 21, to receive the peripheral section of the disk 32. The welding is made between the inner edge of the ring gear 31 and the face of the support disk 32 facing the reaction plate 21, just above the holes 36, which guarantee perfect flatness. The external peripheral rim 25 of the reaction plate 21 extends radially beyond the annular rim 61, 610 of plate 6 and extends axially towards the ring gear 31.

The rim 25 of the plate 21 can have the same average circumference as the ring gear 31. In the embodiment here, the rim 25 extends radially slightly beyond the ring gear 31, which has globally the same height that the rim 25. The rim 25 rigidifies the reaction plate 21 and also increases the inertia of the second mass 2 without however increasing the overall axial dimension of the assembly comprising the double flywheel and the friction clutch vibration damper. A standard clutch cover can therefore be fitted over the reaction plate, in other words a cover deeper than the one in FIG. 2 of the document FR97/12115, while having a reaction plate 21 with a flat dorsal face including the friction face 29 extended at its outer edge. This plate is rigidified by the rim 25.

The support disk 32 can have at its outer edge a section of axial orientation with two distinct sections offset radially relative to each other, as described in the document FR-A-2 526 106. In this case, one of the axial sections carries the starter ring gear 31, whereas the other axial section (which is, in this case, the closer of the two to the reaction plate 21) carries an ignition marker. The ignition marker is an integral part of said axial section which is joined to the main part of the support disk 32 (perpendicular to the axis of symmetry X—X) by an inclined section. In a variant, the axial section can carry fan blades at its free edge.

This is made possible thanks to the presence of an axial space between the rim 25 and the ring gear 31 (FIGS. 1 and 2).

Moreover, this space can be advantageously used to fit the fan blades 240, as shown in FIG. 3. The blades 240 are positioned radially outside the rim 610 and can be molded with the reaction plate 21. The blades 240 are positioned uniformly around the circumference of the plate 21.

The blades 240 point axially towards the ring gear 31 and project beyond the axial limit of the rim 25 of the plate 21. These blades 240 are advantageously inclined or of curved shape to ensure effective ventilation. On their radially outer side they join the rim 25; their axially free edges 241 extend towards the ring gear 31 and are parallel to it. This edge 241 joins an internal oblique edge 242 the end of which is connected to the reaction plate 21. The gap between the edge 241 and the ring gear 31 is small.

At the inner edge of the second mass 2 (radially inside the friction face 29 of the plate 21) there are ventilation holes 23 (FIGS. 1 and 2), 230 (FIG. 3) which enable a flow of air, drawn by the fan blades 240, between the internal face of the reaction plate 21 (the opposite side from the friction face 29) and the first mass 1, thus ensuring that the plate 21 and the bearing means 4, 40 are well cooled.

In all cases, the rim 25 of the reaction plate 21, extending radially beyond the support plate 6 of the first mass, favorably contributes to the thermal mass by this plate 21.

The starter ring gear 31 can be one-piece, forming part of the metal support disk 32, and obtained by metal spinning on an axial peripheral section of the disk 32.

Obviously, the structures can be inverted, in other words in FIGS. 1 and 2 the plate 21 can be fitted with blades, the guide ring 62 being fastened to the edge 6 in the same way that the closing ring 620 is fastened to the rim 610.

Generally speaking the guide ring 62 and the reaction plate 21 jointly define a channel in which the air coming from the ventilation holes 23 can circulate, this flow being enhanced by the action of the blades 240. In FIG. 3, the air from the holes 230 flows over the elastic parts 30, thereby keeping the plate 21 well cooled.

Generally speaking, the blades 240 are very effective due to the fact that, ignoring the presence of the ring gear 31, they are mounted near the rim 25 and therefore above the first mass 1 and at the largest diameter from the axis X—X. In FIG. 3, the blades 240 are mounted radially inside the teeth of the ring gear 31.

The support disk 32 is fastened at its inner edge to the plate 6, in this embodiment by a series of rivets 34 all located at the same distance from the axis X—X.

In a variant, welding is used instead of rivets, for example welding by transparency with the aid of a laser. A first internal fastening area 34 is therefore provided to join the support plate 6 and the support disk 32, here both made of metal.

Since the engine crankshaft vibrates axially, a second fastening area 33 (FIGS. 1 and 2), 133 (FIG. 3) is also provided at a greater diameter than the area 34, towards the outer edge of the plate 6, which is thereby stiffened by the disk 32, in addition to its rim 61, 610.

In FIG. 3, this second fastening area consists of welds 133, more precisely a weld bead. In FIGS. 1 and 2, this second fastening area consists of a series of rivets all located at the same distance from the axis X—X and at a diameter greater than the first series 34. This arrangement provides for control of axial vibrations on the output shaft of the vehicle's engine and makes the support plate 6 stiffer.

In FIGS. 1 and 2, the riveting can obviously be replaced by welding as in FIG. 3, and vice versa.

In FIG. 3, the support disk 32 is attached to the support plate 6. In FIGS. 1 and 2, the support disk 32 is in contact with the plate 6 only at the inner and outer fastening areas 34, 33, which ensures that the plate 6 remains perfectly perpendicular to the axis X—X.

In these FIGS. 1 and 2, the plate 6 has flat support areas 37 near its outer edge provided for fastening the support disk 32 using rivets 33. We note that the internal fastening rivets 34 (FIGS. 1 and 2) are aligned axially with the ventilation holes 23 which can have a flared shape in the direction of the first mass 1. The holes 23 can be circular or oblong in shape.

In FIGS. 1 and 2, the plate 6 is held between the first hub 5 and the second hub 7. More precisely, in this embodiment, the fastening parts 10 consist of long bolts that penetrate axially the bearing washer 51, the two hubs 5, 7, and the support plate 6, and screw into the crankshaft via holes in these parts parallel with the axis X—X. The heads of the bolts 10 press on the bearing washer 51 that immobilizes axially the inner race of the ball bearing 4.

The second hub 7 has a series of localized recesses (not referenced in the figure) to accommodate the heads of rivets 53 penetrating axially aligned holes in the plate 6, the first hub 5 and the washer. In this manner, a double flywheel vibration damper subassembly can be constitute by riveting, containing the first mass 1, coupled to the second mass 2 by the aforementioned vibration damper, that can then be mounted using the bolts 10 on the second hub 7 and the crankshaft.

In practice the plate 6 is fitted on the first hub 5, 50 in advance to form the double flywheel vibration damper that is then mounted on the crankshaft via the second hub 7.

One advantage of the invention is that the double flywheel can be tested separately before mounting on the crankshaft.

In FIG. 3, the plate 6 is fastened by welding. More precisely, a weld bead 54 is made between the inner edge of plate 6 and the outer edge of the first tubular hub 50, this bead being made on the side of the plate 6 opposite from the second hub 7. The first hub 50 carries the bearing 40 at its free axial end. In a variant, the support plate 6 is fastened by crimping, in which case the plate 6 has teeth around its inner edge that engage grooves in the hub 50 that has a bearing shoulder on which the plate 6 is fitted. The plate 6 is immobilized by crimping the material of the hub 50 in contact with the plate.

The other axial end of the hub 5 has a centering function and penetrates the second hub 7. The outer surface of the hub 50 is in close contact with the inner surface (bore) of the second hub 7. The first hub 50 therefore provides a centering sleeve carrying inside it the pilot bearing 9 mounted on an intermediate split ring 55 providing self-adjustment of the pilot bearing 9.

The ring 55 is fitted inside of the tubular hub 50, at the front or the rear. The ring 55 has a shoulder which, in FIG. 3, engages the edge of the axial end of the hub 50 opposite from the bearing 40. The ring includes at least one slot and fits between the inner surface of the hub 50 and external surface of the pilot bearing 9. This arrangement could also be used in the embodiments shown in FIGS. 1 and 2. The use of the ring 55 enables the thickness of the tube 50 forming the first hub to be reduced and avoids having to machine the inside of the first hub. In FIG. 3, the ventilation holes 230 have another function. They are of cylindrical shape and allow the passage of at least one tool for the screwing of the fastening bolts 101 used to assemble the plate 6—and therefore the first mass 1—to the second hub 7. The bolts 101 are short. Their heads bear against the face of plate 6 facing the holes 230. The bolts 101 pass through holes made near the inner edge of the plate 6 to screw into the second hub 7 that has tapped holes for this purpose. The holes 230 are made in the internal hub 220.

The heads of the bolts 101 carry suitable cavities to receive one or more screwing tools. In this manner, the double flywheel vibration damper with the two masses 1, 2 is mounted using the bolts 101 on the second hub 7 with centering between the two hubs 7, 50 thanks to the first hub 50 projecting axial beyond the plate 6 to form a centering sleeve, as described previously.

The second hub 7 is fixed in advance on the engine crankshaft of the vehicle using the aforementioned fastening parts 100 or other fastening means. In FIG. 3, these parts 100 are bolts 100 shorter than those in FIGS. 1 and 2. The bolts 100 are longer than the bolts 101, which can have a diameter less than the bolts 100; the bolts 100 traverse only the second hub 7 to screw into the crankshaft. Localized recesses are provided near the inner edge of the second hub 7 to accommodate the heads of the bolts 100, in this example cylindrical heads with suitable cavities for screwing tools, as for the bolts 101.

In this manner, thanks to the bolts 101, it is possible to remove the double flywheel vibration damper by leaving in place the second hub 7 held on the crankshaft by the bolts 100.

We note that the first hub 50 centers the support plate 6 whose inner edge is in close contact with the outer surface of the hub 50.

It is clear that the two series of fastening parts described with reference to FIG. 3 could also be used in the embodiments shown in FIGS. 1 and 2.

We note that plate 6 covers the heads of the bolts 100 and that the first hub 50 is centered in the second hub 7.

In FIG. 1, the first hub 5 has an axial sleeve 60 at its inner surface, on the opposite side from the bearing 4, whose outer surface serves to center the support plate 6 by being in close contact with its inner edge. The outer surface of the sleeve 60 is in close contact with the inner surface (bore) of the second hub 7 which is centered on the sleeve 60 before being fastened on the crankshaft.

In FIG. 2, these structures are inverted: the hub 7 is prolonged at its free end by an axial sleeve 160 that serves to center the first hub 5. The outer surface of the sleeve 160 is in close contact with the inner surface of the first hub 5.

The plate 6 is centered by its inner edge which is housed in a recess made in the first hub 5 for this purpose. In this case, the plate 6 is centered radially outside the sleeve 160.

In all cases, the plate 6 is centered by the first hub 5, 50.

The bearing means 9 are fitted inside the sleeves 60, 160 or the first hub 50.

In FIGS. 1 and 2, the first hub 5 and the second hub 7 have stepped internal bores of varying diameter in order that, first, the hub of the friction disk can penetrate into the first hub 5 and, secondly, to enable fitting of the pilot bearing 9 whose external diameter is less than that of the friction disk hub. The diameter of the internal bore of first hub 5 is therefore smaller at its end near the second hub 7, and larger at its other end where it penetrates the hub of the friction disk.

In FIG. 3, the change of diameter of the internal bore of the first hub 50 is achieved by use of the ring 55, which means that the bore of the first hub 50 can have a constant internal diameter, which simplifies its fabrication by reducing the machining required. The ring 55 includes several evenly spaced slots.

It is obvious that the double flywheel vibration damper shown in FIGS. 1 to 3 can also can also be fitted on a crankshaft with or without a centering sleeve 160. In this case, the end of the crankshaft also includes a central hole assuring the relative centering between the first hub 5, 50 and the crankshaft in an identical manner to the embodiments in FIGS. 1 to 3. Generally speaking, a complete double flywheel vibration damper is formed by fastening the plate 6 on the first hub using rivets 53 or welding. This subassembly is then fixed either to the second hub, or to the crankshaft.

This double flywheel can be equipped with the elastic parts 3, 30.

In the embodiment of FIGS. 1 and 2, the double flywheel is of the type described in the document FRA2-736-116 which can be consulted for more details.

A secondary metal web 26 is fixed to the internal hub 22 by rivets 27 located at a distance from the axis X—X less than that of the ventilation holes 23.

This web 26 penetrates at its outer edge inside an annular housing or sealed chamber 63 delimited by the plate 6, the guide ring 62, and the rim 61. Two sealing washers 66, 67 close this housing 63 inside which are fitted coil springs 3 constituting the aforementioned elastic parts acting circumferentially between the two masses. In this manner, the rivets 27 are not used to fasten the sealing washers. The metal plate 6 and the metal guide ring 62 are stamped in the opposite sense compared with disk 26, towards the outside, respectively referenced 68, 69 in the figures to form an annular channel for the springs 3; the housing 63 is filled with grease to lubricate the springs 3.

The stamped parts 68, 69 are interrupted by deformations, respectively 64, 65, which provide stops for the ends of the springs, which are thereby retained in circumferential segments of the annular channel. In the rest position of the double flywheel, the arms of the web 26 are opposite the deformations 64, 65.

The outer edge of the web 26 is offset axially in the direction of plate 6 relative to the inner edge of the web 26 in contact with the internal face of the reaction plate. The rivets 27 are aligned with the holes 70.

The springs 3 are pre-curved to make them arc shaped. The web 26 has arms inside the housing 63, as shown in to FIG. 2 of the document FR-A-2 736 116. These arms delimit cavities housing the springs 3.

The arms and therefore the web 26 extend radially between the plate 6 and the guide ring 62. The sealing washer 66 is fixed to the plate 16, according to a characteristic of the invention, using the internal rivets 34 fastening the support disk 32 to the support plate 6. The washer 66 is inclined in the direction of the web 26 and its outer edge presses elastically against this web 26. The sealing washer 67 is fixed to the web 26 by a series of rivets 134 aligned axially with the ventilation holes 23. The rivets 134 are formed by extrusion from the web 26, here of stamped sheet steel. The outer edge of the washer 67, fitted radially outside the rivets 134, 34, 27, presses elastically against the guide ring 62 at its internal edge. The washer 67 is substantially flat. In this manner, the rim 74 replaces the plugs of the document FR-A2 736 116 and the rivets 27 have hollow heads forming a pin 28 that drive rotationally, possibly after taking up any circumferential play, a friction ring forming part of the friction means 8 acting axially. These friction means 8 are of the type described in the document FR-A-2 736 116 and therefore contain a friction ring that has slots on its outer edge into which penetrate the pins 28, with or without circumferential play, enabling the second mass 2 to rotate the friction ring.

The friction ring presses against the transversal shoulder of the first hub 5 and against an application washer connected rotationally to the first hub by means of radial tabs, forming pins that penetrate into axial grooves, in the form of mortises, formed in a machining allowance 52 on the outer diameter than is greater than the diameter carrying the bearing 4 at the free end of the first hub. The application washer is subject to the action of an axially acting spring washer, here a Belleville washer, held by a circlip fitted in an annular groove cut in the machining allowance 52 of the first hub 5. In this manner, the spring washer squeezes the friction ring between two faces or surfaces of the first mass 1 and, during a relative movement of the two masses 1, 2, the friction washer driven by the second mass 2 rubs against the two surfaces of the first mass 1.

The rim 61 of the support plate 16 has stepped diameters at its outer edge and an outer section at its free end of greater diameter which joins the actual rim 61 via a shoulder. This shoulder blocks in one axial direction the guide ring 62 mounted on the inside of the outer section of the edge 61. The guide ring 62, on its outer edge, is in close contact with, and therefore centered by, the inner side of the outer section of the rim 61. The guide ring 62 is fastened in the rim 61 of the plate 16 by welding together the free edge of the outer section of the edge 61 and the axially-oriented outer edge of the guide ring 62. The latter edge of the guide ring fits into the outer section of the rim 61 and assures the centering the guide ring 62.

The welding consist of a weld bead. The internal face (facing towards the first mass 1) of the reaction plate 21 is cut back (24) to reduce its axial dimension.

The recess 24 is delimited by the rim 25. It is flat-bottomed in the section facing the free edge of the rim 61 to avoid contact with the latter. This flat bottomed section joins the thicker section of the plate 21 by a sloped section orientated towards the first mass 1 and radially towards the axis X—X to avoid contact with the deformations 69 of the guide ring 62.

The recess 24 is of trapezoidal shape. During a relative angular movement between the two masses, the web 26 moves relative to plate 6 and in the guide ring 62 with a compression of the springs 3.

The guide ring 62 can of course be fastened to the rim 61 by crimping, in which case, for example, the rim 61 has slots on its free edge which receive pins on the outer edge of the guide ring 62. The edges of the slots are then crushed to crimp the pins in the slots.

The presence of the outer section 61 of the rim 61 and of the outer edge of the guide ring 62 is not compulsory. However, this outer edge offer the advantage of stiffening the guide ring 62.

This description illustrates that the first mass 1, leaving aside the first hub 5 and the springs 3, contains only light metal parts of simple shape, here of stamped sheet steel, namely the disk 32, the support plate 6, the guide ring 62 and the secondary web 26. The sealing washers 66, 67 are made of thin metal to ensure their elasticity. The washer 66 presses elastically against the web 26 and the washer 67 presses elastically against the inner edge of the guide ring 62 of large internal diameter. The support areas 37 of plate 6 lie in the plane of the inner edge of plate 6.

The support areas 37 are at the tops of the deformed sections 68 of the plate 6, which extend in the direction way from the web 26. These stamped sections 68 join a flat section 164 of the plate 6 which lies perpendicular to the axis X—X and in the plane of the deformations 64.

The section 164 is therefore prolonged by the deformations 64 in contact with the ends of the springs and at its inner edge it joins the plate 6, which lies in the plane of the support areas 37.

In this manner, plate 6 includes an intermediates section 164 perpendicular to the axis X—X and offset axially in the direction of the web 26 relative to its inner and outer edges which lie in the same transversal plane. We note that the internal hub 22 is offset axially in the direction of plate 6 relative to the friction face 29 and to the reaction plate itself. The stamped part 69 is also offset axially towards the internal hub 22, here towards its recess 24. The inner edge of the web 26 provides a stop for the outer race of the bearing 4.

In FIGS. 1 and 2, the friction means 8 are carried by the first hub 5 and are located axially between the bearing 4 and a transversal shoulder of the first hub 5, directed towards the second mass.

In FIG. 3, the friction means 80 are carried by support plate 6 of the first mass 1. These means 80 extend radially beyond the bearing 40 and the fastening bolts 100, 101.

These means 80 contain pins 128 forming part of trunnions 127 shaped to form rivets at the ends opposite the pins.

There are holes (not referenced in the figure) in the plate 16 axially opposite these pins 128. These holes are blocked by the free face of the second hub 7. The trunnions 127 penetrate holes in the internal hub 220, as described in the document EP-A-0 798 490. The trunnions 127 therefore traverse an axially acting spring washer (not referenced in the figure) and have a crushed head in contact with the spring washer and a locking collar in contact with the internal face of the hub 220 facing the plate 6. The axially acting spring washer forms part of the torque limiter 250. The washer here includes at its outer edge an inclined section in the shape of a Belleville washer. At its inner edge this part joins a connecting section which in turn joins at its inner edge the spring washer traversed by the trunnions 127.

The connecting section has holes (not referenced in the figure) which engage corresponding internal tabs on the application washer (not referenced in the figure). The application washer forms part of the torque limiter 250 and is connected rotationally by its internal tabs to the axially acting spring washer.

The application washer constitutes one of the lateral faces of a throat which engages an internal ring (not referenced in the figure) orientated transversally on the inner edge of the reaction plate 21.

The internal ring is thinner than the reaction plate. The other lateral face of the throat is formed by the face of a web that includes on its outer edge, projecting radially outwards, the internal hub 220 offset axially in the direction of plate 6 relative to the friction face 29.

The bottom of the throat is formed by an annular face of axial orientation that is part of the outer face if the hub 220. This bottom provides centering for the inner edge of the internal ring. In this way, the reaction plate is mounted in a rotary manner on the bottom of the throat belonging to the torque limiter 250.

The axially acting spring washer of the torque limiter 250 bears on the application washer and squeezes the internal ring of the reaction plate between the lateral faces of the throat, in other words between the application washer and the web of the internal hub. Normally, the squeezing of the spring washer is such as no rotational movement occurs between the internal hub 220 and the reaction plate 21, mounted rotationally on the bottom of the throat. In the event of an excessive torque, relative slippage occurs between the plate 21 and the hub 220.

The closing ring 620 is fixed by a weld bead to the free edge of the rim 610.

Locally, spacers 81 of stepped diameter connect the closing ring 620 to the support plate 6. Rivets 82 traverse holes in the spacers 81, the plate 6 and the closing ring 620 to fasten the spacers to the support plate 6 and the closing ring 620, which are therefore fixed in two areas at different radial distances from the axis X—X.

The spacers 81 are positioned radially outside the position of the internal fastening rivets 34.

The rivets 34 traverse axially aligned holes in the disk 32, the plate 6, a metal plate 83 and a cup washer 84. The rivets 34 therefore also fasten the parts 83, 84 to the support plate 6. More precisely, the support disk 32 and the plate 83, here of stamped sheet steel, are positioned on either side of the plate 16, radially outside the edge of the rim 74 of the second hub 7. The cup washer 84 is axially elastic and forms part of the axially acting friction means 80.

The elasticity of the cup washer 84 is obtained for example by making oblong slots in the intermediate part of the washer. At rest, the cup washer 84 has a tapered shape and is inclined in the direction of the plate 6.

The plate 83 is also fixed to the support plate 6 thanks to the spacers 81.

For this purpose, one end of a spacer 81, of smaller diameter than the other end, is fits into a hole 85 in the plate 83. The axial length of this smaller section of the spacer 81 is of course less than the thickness of the plate 83.

In this manner, the plate 83 is fastened, radially outside the rivets 34, to the support plate 16 by the spacers 81 and the rivets 82.

The spacers 81 and the plate 83 increase the inertia of the first mass in a simple and inexpensive way. Holes are made in the support disk 32 opposite the rivets 82, whereas recesses are made in the closing ring 620 to accommodate the feet of the rivets 82. The spacers 81 and the rivets 82 thereby fasten the closing ring 620 and the plate 83 to the support plate 6. The outer edge of the plate 83 is offset axially in the direction of the mass to avoid obstructing the area where the rim 610 joins the support plate 6.

The plate 83 has notches on its inner edge which engage radial tabs on the inner edge of an application washer.

The application washer forms part of the friction means 80 and provides a friction face for a friction ring in contact with the internal face of the plate 6 directed towards the second mass 2.

A first friction ring is squeezed between the internal face of plate 6 and the application washer under the action of an axially acting spring washer, here a Belleville washer (not referenced in the figure), that bears on the cup washer 84 to solicit the application washer which is free to move in the direction of plate 6.

The inner edge of the cup washer 84 bears on a second friction ring to press on it axially in the direction of the internal face of plate 16.

The second friction ring is of synthetic material and has notches on its inner edge which engages the pins 128.

The second friction ring has a set of male teeth on its outer edge, whereas the first friction ring has a set of female teeth on its inner edge. These sets of teeth comprise alternating teeth and slots advantageously of trapezoidal shape. The teeth and slots of the male teeth engage respectively the slots and teeth of the female teeth, thereby providing means of circumferential gear meshing, possibly with some backlash.

In this manner, the first friction ring meshes circumferentially with the second friction ring. The axially acting spring washer applies a higher load on the first friction ring 84; the second friction ring rubs permanently during any relative movement of the two masses.

In this manner, the first friction ring act a little later, taking up any circumferential backlash in the means of circumferential gear meshing.

The thickness of the plate 83 therefore provides for accommodation of the friction means including the two friction washers, the application washer, the Belleville washer and the cup washer 84. The friction means 80 are carried by the plate 6 and the plate 83 and include a second friction ring driven rotationally by the pins 128 fixed to the second mass 2.

A second series of trunnions 86 is fitted on the outer edge of the closing ring 620 and the plate 6. Every trunnion includes a collar projecting radially; one of its axial ends engages an opening in the closing ring 620 and the other end engages axially aligned openings in the plate 83, the plate 6 and the disk 32.

The collar of every trunnion is in contact on one of its faces with the outer edge of the plate 83. The other face of the collar is in contact with a first articulating part, as described in the aforementioned document FR97/12 115. The first articulating part is traversed by the trunnions 86 and forms part of a unit 87, here of cylindrical shape, containing a piston 88 connected to a rod 89 that traverses a washer 90 fastened to the lower end of the unit 87. On the inner edge of the rod 89 there is a second articulation part mounted on the first trunnions 127 located on a circumference of diameter less than that of the second trunnions 86.

Coil springs 30, mounted concentrically, are fitted between the piston 88 and the washer 90.

The springs 30 therefore work in compression during relative movement of the two masses and they form part of cassettes including the unit 87, the piston 88 and the rod 89.

The compression springs 30 can obviously be replaced by traction springs with their end turns engaging the trunnions 127, 86.

It is clear that the holes in the plate 6 located opposite the pins 28, 128 are always blocked by the second hub, so the interior of the first mass is protected. The friction means 8, 80 are therefore protected against any pollution by the second hub 7. The guide ring 62 and the closing run 620 have a large internal diameter and encircle the internal hub 22, 220 at some distance.

Thanks to the second hub 7, the support disk 32 can be very near to the heads of the bolts 100 that project relative to the crankcase wall 75 of the internal combustion engine.

In FIGS. 1 and 2, anti-wear parts, for example tubes, can be interposed between the outer surface of the springs 3 and the housing 63.

It is clear in FIG. 3 that the first hub 50 is a tube and constitutes at the end opposite the bearing 40 a centering sleeve, like the sleeve 60 in FIG. 1. The first hub 50 is therefore very thin, which provides for reduction of the size in the bearing means 40 (located just inside the holes 230 provided for aeration and passage of at least one tool for fastening the bolts 100, 101) and also enables the length of the cassettes and springs 30 to be maximized.

In FIG. 2, the drive shaft 300 (crankshaft), the driven shaft 301 (the gearbox input shaft), and the hub of the friction disk are shown as dotted lines.

In the embodiments of FIGS. 1 and 2, it is of course possible to increase the number of springs 3 and/or to fit them along two circles of different diameter.

The springs 3 cannot be greased as described in the document FR-A-2 166 604.

In FIG. 3, the spring cassettes 30 are distributed circumferentially at regular intervals (star-fashion). The cassettes alternate circumferentially with the spacers 81 and increase the inertia of the primary mass.

In all the figures the free end of the second hub 7 provides an axial bearing surface for the support plate 6, or more precisely for the inner edge of this support plate.

The bolts 100, 101 can be located at different diameters instead of alternating on a circle of substantially constant diameter (FIG. 3).

The fastening of plate 6 on the first hub 50 by welding enables optimal simplification of the first hub 50.

In a variant, the rim 25 of the reaction plate 21 can be prolonged axially in the direction of the starter ring gear 31 by fan blades 340 distributed circumferentially in a regular manner, as shown by the dotted lines if FIG. 2. In this case, the blades 340 extend radially slightly beyond the ring gear 31.

The support 32 can of course be prolonged radially outwards so that the ring gear 31 extends radially beyond the rim 25 and the blades 340.

As show by the dotted lines in FIG. 1, the starter ring gear 31 can have blades 440 that work in association with the blades on the second mass, in which case the blades on the reaction plate 21 are made shorter axially. The blades are inclined or curved for greater efficiency.

Figure 4:
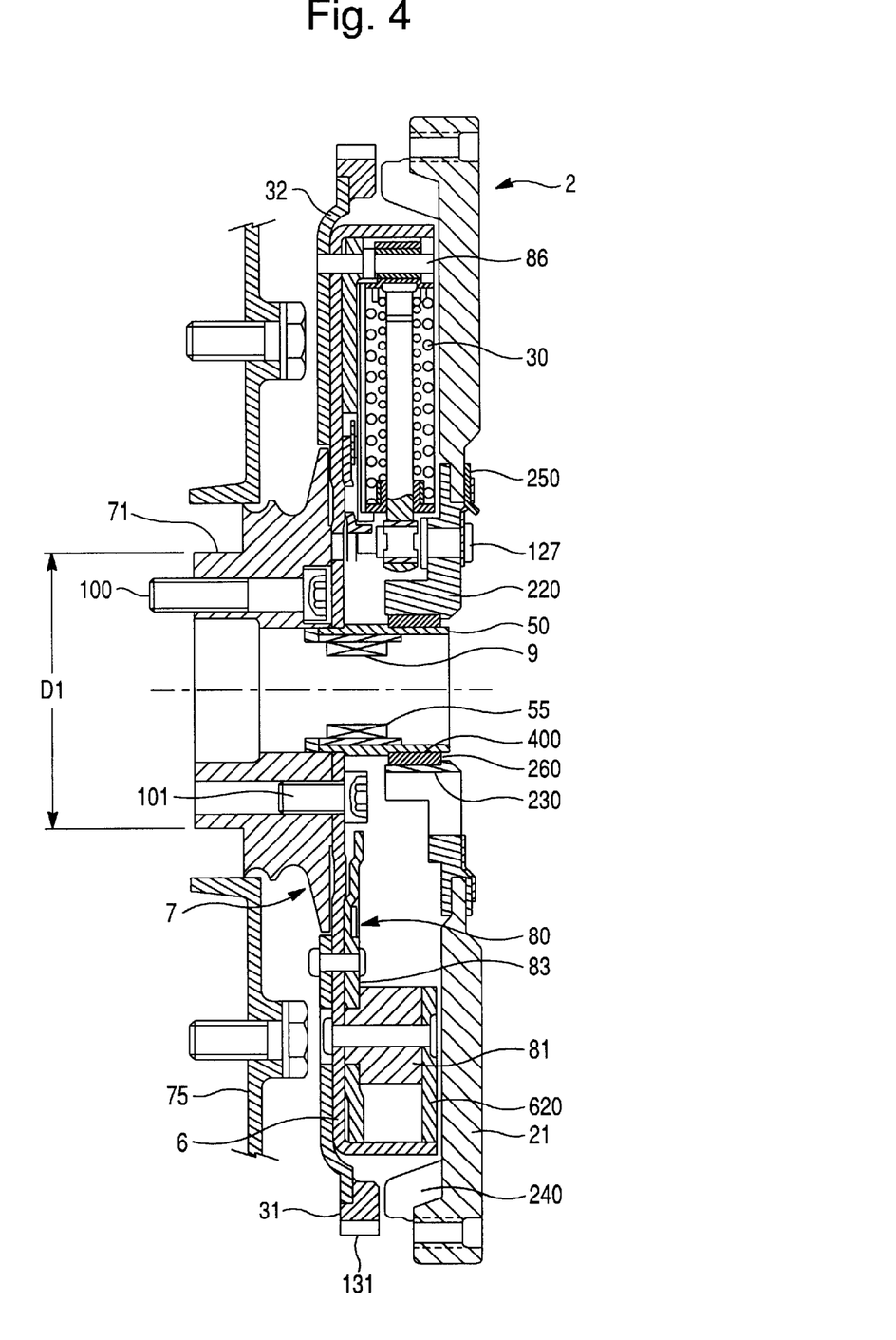
FIG. 4 is a view similar to that of FIG. 3 with bearing means in the form of a plain bearing.

In FIG. 4, the bearing 40 of FIG. 3 is replaced by a plain bearing 400 mentioned earlier which allows the length of the cassettes and springs 30 to be further increased.

As shown in this figure, the recess 71 is formed by a change of diameter of the second hub 7 which then presents to the crankshaft an end of diameter D1. In this case the crankshaft has an end of diameter D1 less than that of the main part of the second hub 7, and the second hub 7 is then wider than the end of the crankshaft.

We note that the first hub of FIG. 4 differs from that of FIG. 3 only by the axial elongation of the section carrying the gearing 400 which is axially clocked by the circlip 260 and the change of diameter as in FIG. 3.

In FIGS. 3 and 4, the support plate 6 is deformed locally in the direction of the second mass 2 to provide a bearing surface for the second friction ring 80.

Thanks to the plate 83, the means 80 can easily be accommodated between plate 6 and the spring cassettes 30 without increasing the overall axial congestion. The second hub 7 can include a fool-proof fitting device, for example in the form of a pin that engages the support plate 6 and/or the first hub 5. The structures can of course be inverted.

Figure 5:
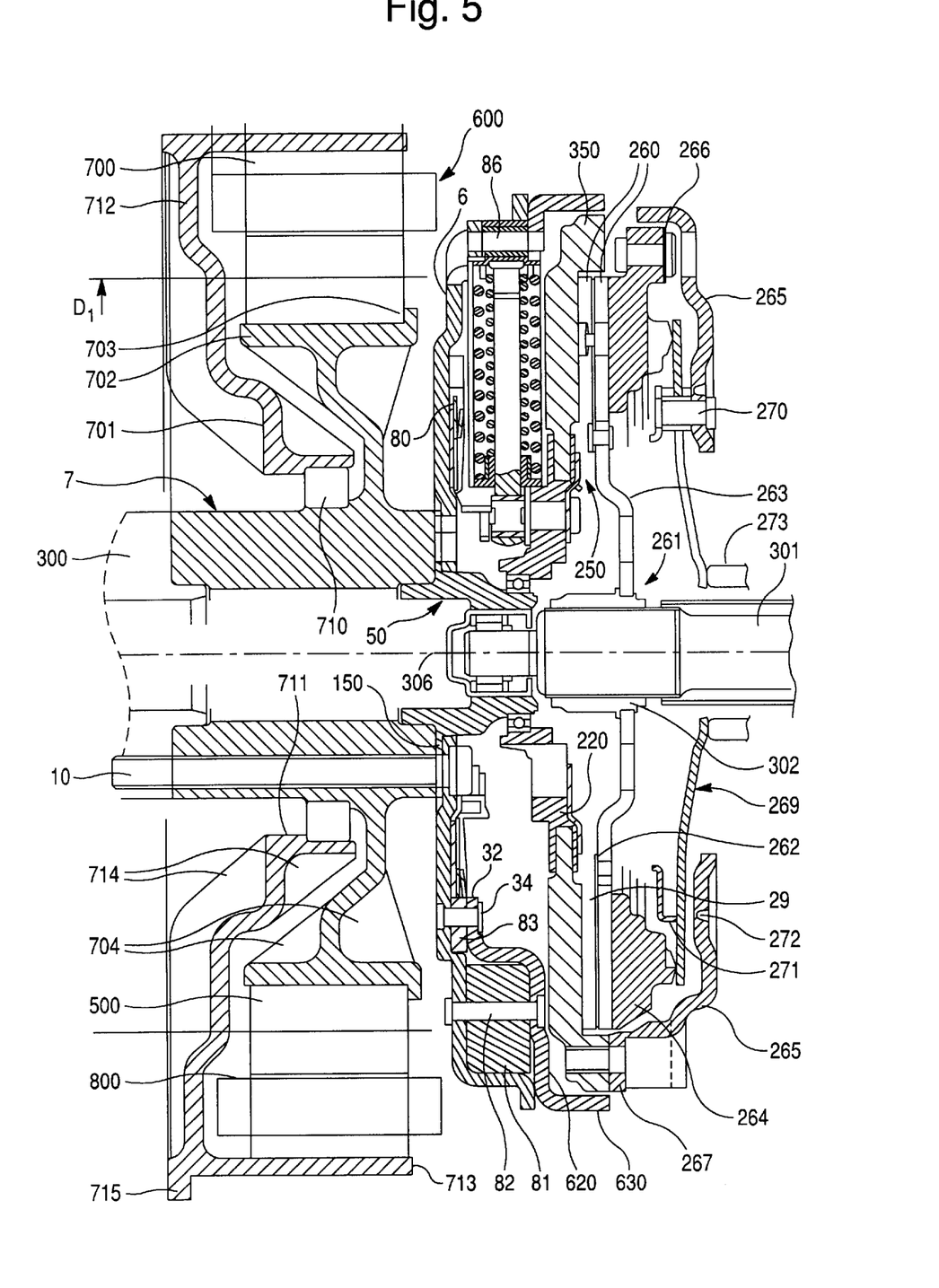
FIGS. 5 and 6 are views similar to that of FIG. 3 with presence of an electric machine.

In FIG. 5, the second hub 7 carries the rotor 500 of an electric machine 600 which also has a stator 700 here surrounding the rotor 500.

This rotor 500 and stator 700 are coaxial parts mounted radially one above the other and separated by an air-gap 800. Built into the second hub 7, near the free end, there is a second web 701 of sinuous profile extending radially outwards and carrying on its outer edge a sleeve 702 of axial orientation with a transversal shoulder 703 on the rear end.

The second web 701 and the extremities of the sleeve 702 are joined by ribs 704.

The second hub 7 carries second bearing means 710, here a ball bearing, located at the root of the web 701 on the drive shaft 300 side.

The inner race of the bearing 710 slide-fits onto the second hub, whereas the outside race of the bearing fits inside a bushing 711 with a shoulder made inside a bell housing 712 which has on its outer edge a skirt 713 and lugs 715 with holes for fastening the part 712 to the fixed wall of the engine crankcase (not shown) using bolts (not shown). The number of lugs depends on the application.

The housing 712 has a tortuous profile to enable the rotor 500, the sleeve 702 and the web 701 to rotate close to it.

This housing 712 has strengthening ribs 714 and is intended to be mounted on the engine block of the vehicle using bolts (not shown). The second bearing means 710 ensure that the air-gap between the rotor 500 and the stator 700 is precisely defined.

The second hub 7 can of course penetrate the engine as in FIGS. 1 to 4 and can have a recess to house a sealing ring, and a first throat.

In a known manner, the stator 500 and the rotor 700 each include a stack of laminations (core plates) insulated from each other by oxidation or insulating material. The laminations are made of soft iron and reconstitute an axially orientated ring mounted respectively on the sleeve 702 and the skirt 713, for example by binding or shrinking, which is why the sleeve 702 has a shoulder 703. In a variant, the assembly is made by grooving, welding, screwing, or by rods in grooves.

In a variant, the skirt 713 and the sleeve 702 and the stacks of core plates have conical sections. The stator 700 has windings of electrical wire connected to a power and control unit. In this manner, the machine 600 provides an alternator and a starter for the internal combustion engine.

The machine here is of asynchronous type but it can also be of synchronous type and therefore have magnets mounted in the air-gap 800 or embedded. The machine 600 can make use of radial or axial flux. In variants, this flux switching electric machine may be magnet-only or hybrid, with brushless clamps, variable reluctance, single and double excitation, transversal inflow, etc.

This machine 600 can be used to filter vibrations, and to brake or accelerate the thermal engine of the vehicle. For more details, refer to the document WO98/05832.

The first mass of the double flywheel vibration damper therefore carries, via the second hub 7, the rotor 500 of an electric machine 600.

In FIG. 5, the friction pads of the friction disk 261 with a hub 302 coupled rotationally with the driven shaft 301 are seen in 260.

The friction pads 261 are fixed to a support 262 by riveting to a web 263 attached by crimping to the hub 302. The friction pads 260 are therefore coupled in a rigid manner to the hub 302. Moreover, in 264 we see the pressure plate linked rotationally, with axial mobility, to the cover 265 by tangential tabs 266.

On its outer edge the reaction plate 21 has an annular skirt 350 of axial orientation, here molded with the plate 21. The skirt 350 points axially the opposite way to the rim 25 of FIG. 3.

On its outer edge the cover 265 has a radial rim 267 with holes to enable it to be fastened by bolts 268 to the skirt 350 surrounding the friction pads 260. The cover 265 carries the diaphragm 269; mounted in an articulated manner using small pins 270 traversing the diaphragm 269 axially to provided riveting to a rolled ring providing a secondary support 271 for the diaphragm 269 opposite a primary support 272 formed pressing in the cover 265. By pressing using a clutch release bearing, represented schematically as 273, the diaphragm 269 can be pivoted to disengage the clutch.

The support plate 6 is fixed to the plate 83 as in FIG. 3, but in this embodiment the support disk 32 is modified and mounted on the other side of plate 6. The support disk 32 forms part of the closing ring 620 forming with the plate 6 cavities in which spacers 81 are fitted, with two series of rivets 34, 82 as in FIG. 3. Here, the plate 83 is sandwiched between the support disk 32 and the plate 6.

The rivets 82 serve only for fastening the spacers 81, the plate 6, and the part combining the disk 32 and the closing ring 620.

This part 32-620 is of stamped sheet steel. The closing ring 620, and therefore the disk 32, has at its outer edge an annular edge of axial orientation lying outside the skirt 350.

The rest of the flywheel vibration damper is identical to that of FIG. 3. A series of bolts 10 fasten the hubs 50, 7 to the crankshaft 300, as in FIG. 2.

Two series of bolts can of course be used, as in FIGS. 3 and 4. Here, the first hub 50 has a radial web 150. The plate 6 is in contact with the face of the web 150 on the opposite side from the second hub. The bolts 10 traverse the plate 16, the web 150 and the second hub 7 to screw into the crankshaft. The plate 6 is associated with the first hub 50.

The plate 6 can be fastened by welding or gluing to the web 150.

In a variant, plate 6 is riveted on the web 105, in which case the second hub 7 has a recess as in FIG. 1 to accommodate the heads of the fastening rivets. In a variant, plate 16 is free.

It is therefore clear that by feeding electrically the windings of the stator 700, for example using alternating current, the machine 600 is transformed into a starter. When the engine is running, the machine forms an alternator generating alternating current that can be rectified. Other combinations are possible. In this manner, the double flywheel vibration damper of FIG. 5 can be of the type shown in FIGS. 1 and 2.

It can be equipped with bearing 400 of FIG. 3. In FIG. 5, the plate 16 is pressed locally at the position of the trunnions 86.

The stator 500 is here fixed to the sleeve 702 radially inside the external diameter D1 of the friction pads 260 and radially outside the internal diameter of the friction pads 260 and the friction face 29. The shaft 301 carries a cage 306 press-fitted in the first hub 50 and containing a pilot bearing and a watertight dynamic seal.

The rotor 500 can of course be fixed nearer the shaft, radially inside the friction face 29, combining the features shown in the various figures.

In this manner, in a variant, the second hub 7 takes the form shown in FIGS. 1 to 4 and the reaction plate 21 has at its outer edge an annular skirt of axial orientation of the type shown in FIG. 5, this skirt advantageously being an integral part of the plate. This skirt then carries at its outer edge the rotor 500 of the electric machine, whose stator is carried, opposite the rotor, by the clutch bell housing fastened to the gearbox.

The stator therefore surrounds the rotor. In a variant, the clutch is of the double-disk type including two friction disks of the type shown in FIG. 5, with an intermediate pressure plate between the friction pads of the two disks. The skirt of the reaction plate is then longer axially, as is the rotor mounted for example by binding on the outer surface of the skirt. This reduces the overall radial size of the clutch.

The second mass of the double flywheel vibration damper may therefore carry the rotor of the electric machine. Good filtration of vibrations is obtained in all cases at high rotational speeds of the engine.

In a variant, support plate 6 can be eliminated and replaced by a heavy part. In this manner, in FIG. 6 the first hub 50 and a plate 900 are provided by a single part.

The plate 900 replaces the parts 6, 83, 81 of FIGS. 3 to 5. The plate 900 is made here by molding with the first hub 50, for example in cast iron or aluminum.

The face of plate 900 facing the second mass 2 forms a friction face for the axially acting friction means 80 of the type described in FIGS. 3 to 5.

Figure 6:
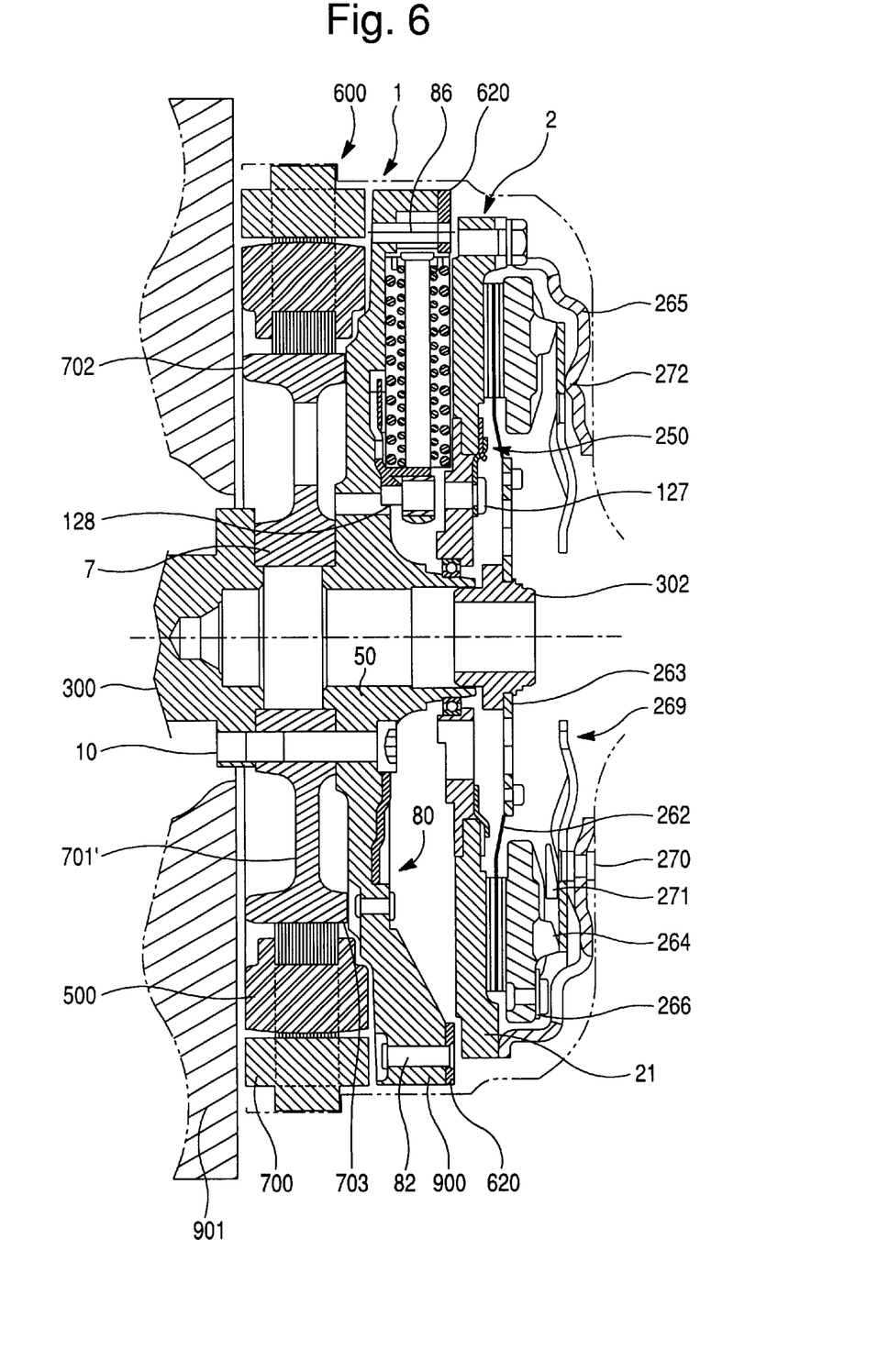

The second hub 7 carries directly the rotor 500 of the electric machine 600. The rotor 500 is surrounded by the stator 700 fixed to the vehicle's engine 901, for example using bolts. The second web 701' is here of transversal orientation and is therefore of more simple shape than the web 701 of FIG. 5. The web 701 has openings (not referenced in the figure) notably to reduce the weight of the assembly comprising the second hub 7, the web 701', and the rotor 500.

The bearing means 710 of FIG. 5 is eliminated, reducing the overall dimension. Here the web 701', the sleeve 702, the shoulder 703 and the second hub 7 constitute a single part made for example by molding. The first mass 1 therefore carries the rotor 500 via the second hub 7. The second mass 2 is similar to that of FIG. 5.

We note that the small pins 270 have profiled heads 271 directly forming the secondary support of the diaphragm 269. The web 263 is simplified and in this embodiment does not have a sinuous profile.

The support 262 presents at its edge an internal fold and is fixed as in FIG. 5 along its inner edge on the outer edge of the support 262, here by riveting.

The first hub 50 serves to center the second hub 7. The closing ring 620 is simplified because the spacers 81 are eliminated and are replaced by the material of the plate 900.

As already explained, the cover 265, the pressure plate 264 and the diaphragm 269 form a single unit referred to as the "clutch mechanism" which is attached by its cover 269 to the reaction plate 21, here by screwing as shown at the top of FIG. 6.

This single assembly can be equipped with a wear compensation device to compensate at least for the wear of the friction pad(s) of the friction disk. Such device is described for example in the document OE-A-42 39 289 which can be referred to for more details.

This wear compensation device includes ramps and counter-ramps. The ramps are associated with a ring which presses on the diaphragm, whereas the counter-ramps are associated either with the pressure plate (FIGS. 28–34) or the cover (FIGS. 1–27, 35 and 36).

It is therefore possible to create the first module including the clutch mechanism and the double flywheel with the exception of the second hub 7, since the plate 900 is fastened to the first hub 50. The same applies for the other embodiments. For this purpose, axially aligned openings are made in the diaphragm 269, the web 263 of the friction disk, and the second mass 2 (here in the internal hub). These openings provide access by one or more tools to fastening bolts 10 (or in a variant, to bolts 101 of FIGS. 3 and 4) to attach this first module to the crankshaft with insertion of the second module including the second hub 7 and the rotor 500 of the machine.

In this manner with the bolts 10, the second modulate can be mounted on the bolts 10, making them captive, for example by using flexible locking means or other means acting between the second hub 7 and bolts 10. Next, the assembly is fixed on the crankshaft using at least one screwing tool that passes through the aligned holes in the diaphragm 269, the web 263 and the internal hub 220. in a variant, the second module 7–500 is fixed to the crankshaft in advance using bolts of the same type as the bolts 100 in FIG. 3 and the first module is fixed on the second module 7–500 using shorter bolts of the same type as the bolts 101 in FIG. 3.

Advantageously the diameter of the openings in the diaphragm 269 is less than that of the heads of the bolts 10 or 101. The same is true of the openings in the friction disk and the internal hub. The fastening bolts 10, 101 are then captive.

The bolts can be made captive using flexible means or gluing, for example between the threaded part of bolts 10, 101 and the tapped holes made in the plate 900 or plate 6.

In this manner the fastening bolts can be integrated in the first and/or second module.

The second hub 7 could of course be force-fitted on the first hub 5, 50 to form one assembly comprising the first and second modules. In a variant, the two hubs are fastened in advance by riveting, gluing, screwing, crimping, etc. to form one complete subassembly before fastening the bolts in the crankshaft.

What is claimed is:

1. Double flywheel vibration damper including two coaxial masses (1, 2) free to rotate relative to each other and acting against elastic parts (3, 30), in which one of the masses, referred to as the first mass (1), is intended to be fastened to a drive shaft, whereas the other mass, referred to as the second mass (2), includes a reactionplate (21) assuring rotational connection to a driven shaft, and in which said first mass (1) has a central hub (5, 50-7) projecting axially and carrying bearing means (4, 40) operating between said second mass (2) and said central hub (5, 50-7) to enable said second mass (2) to rotate on said first mass (1), wherein said central hub (5, 50-7) comprises two aligned coaxial parts, namely a first hub (5, 50) supporting said second mass (2) rotationally via said bearing means (4, 40) fitted on this first hub, and s second hub (7) intended to be fastened to said drive shaft, and wherein said second hub (7) constitutes an axial spacer between said drive shaft and said first hub (5, 50).

2. Double flywheel according to claim 1, wherein said first mass (1) includes a support plate (6) associated with said first hub (5, 50).

3. Double flywheel according to claim 2, wherein said support plate (6) is centered by said first hub (5, 50).

4. Double flywheel according to claim 2, wherein said first hub (5, 50) and said support plate (6) are traversed by first fastening parts (100, 101-10).

5. Double flywheel according to claim 4, wherein said first fastening parts (10) traverse said second hub (7) to fasten it to said drive shaft.

6. Double flywheel according to claim 4, wherein said first fastening parts (101) fit into said second hub (7) and alternate circumferentially with second fastening parts (100) fastening said second hub (7) to said drive shaft.

7. Double flywheel according to claim 2, wherein said support plate (6) is fixed by said first fastening parts (101) to said hub (7), and wherein said second fastening parts (100) are provided to fasten said second hub (7) to said drive shaft.

8. Double flywheel according to claim 2, wherein one of the parts of said first hub (5, 50) or said second hub (7) carries on its inner surface a pilot bearing (9) that houses the end of said driven shaft.

9. Double flywheel according to claim 2, wherein a support disk (32) is fixed by its inner edge to said support plate (6) radially outside said second hub (7) and on the opposite side of said support plate (6) from said second mass (2).

10. Double flywheel according to claim 9, wherein said support disk (32) carries a closing ring (620) that has second trunnions (86) providing articulated mounting of elastic parts (30) acting radially between the two said masses (1, 2).

11. Double flywheel according to claim 10, wherein said second mass carries on its inner edge first trunnions (127) providing articulated mounting of said elastic parts (30).

12. Double flywheel according to claim 1, wherein said second mass (2) is in two coaxial parts, namely a reaction plate (21) mounted rotationally on an internal hub (220) offset axially relative to said reaction plate (21) in the direction of said first mass, and wherein a friction-type torque limiter (250) is fitted between said reaction plate (21) and said internal hub (220).

* * * * *